(No Model.)
A. K. JOHNSON.
WHITE LEAD COOLER.
No. 361,590. Patented Apr. 19, 1887.
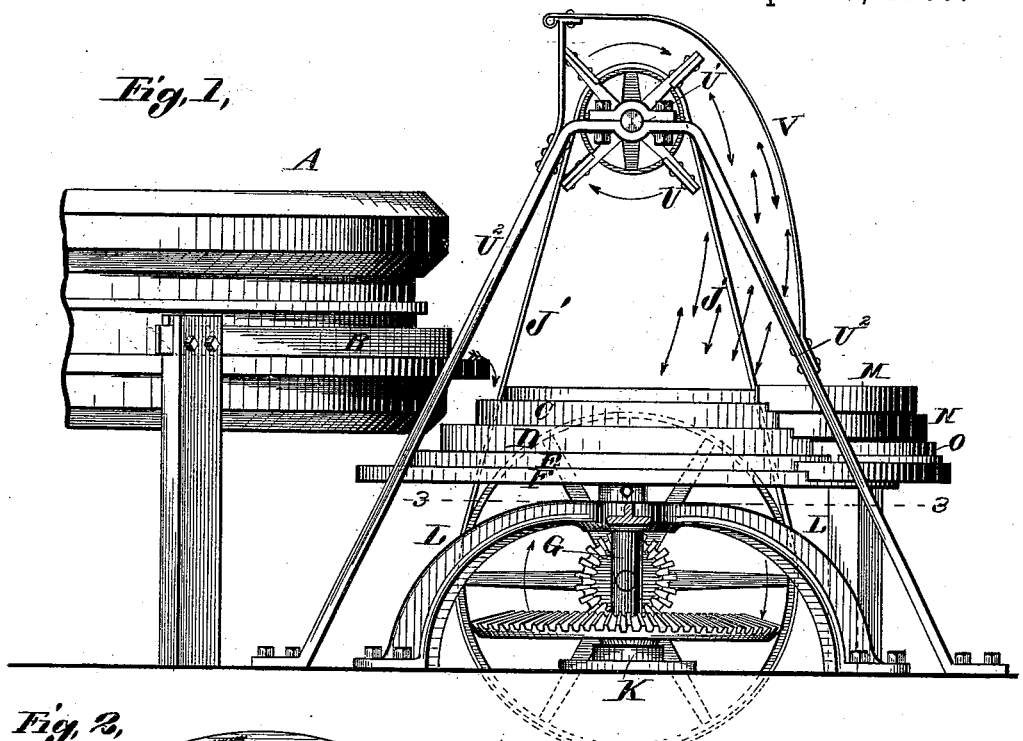
Fig. 1.
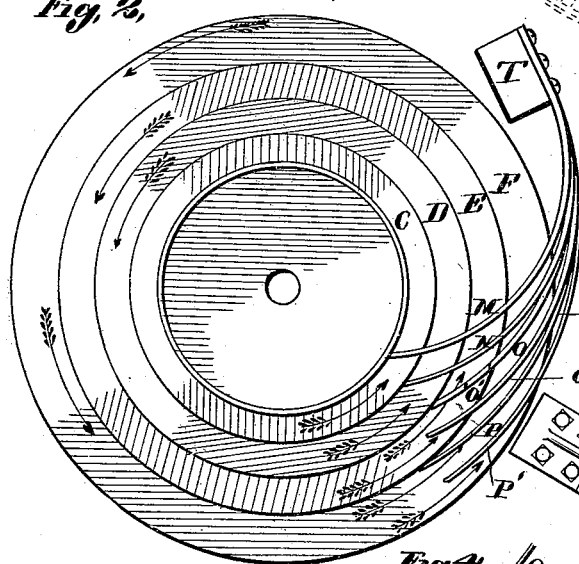
Fig. 2.
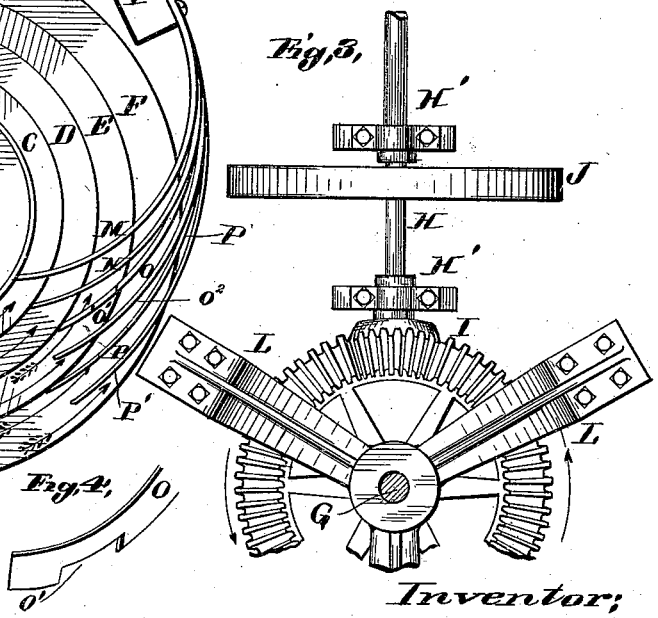
Fig. 3.
Fig. 4.
Attest:
G. W. Hinchman Jr.
H. C. Knight
Inventor:
A. K. Johnson
By Knight Bro?
Atty's.

UNITED STATES PATENT OFFICE.

ABRAHAM K. JOHNSON, OF ST. LOUIS, MISSOURI, ASSIGNOR OF ONE-HALF TO WILLIAM H. CALVERT, OF SAME PLACE.

WHITE-LEAD COOLER.

SPECIFICATION forming part of Letters Patent No. 361,590, dated April 19, 1887.

Application filed November 1, 1886. Serial No. 217,761. (No model.)

*To all whom it may concern:*

Be it known that I, ABRAHAM K. JOHNSON, of the city of St. Louis, in the State of Missouri, have invented a certain new and useful Improvement in White-Lead Coolers and Conveyers, of which the following is a full, clear, and exact description, reference being had to the accompanying drawings, forming part of this specification, and in which—

Figure 1 is a side elevation of my improved cooler and conveyer, showing part of the stone. Fig. 2 is a top view of the disks and scrapers. Fig. 3 is a detail horizontal section taken on line 3 3, Fig. 1. Fig. 4 is a detail perspective view.

My invention relates to an improved device for conveying white lead from the grinder or mixer to a receptacle, and for cooling the lead while thus being conveyed; and my invention consists in features of novelty, hereinafter fully described, and pointed out in the claims.

Referring to the drawings, A represents a grinder or mixer, from which the lead is removed by a scraper, B, and falls upon a disk, C. Beneath the disk C are a number of disks, D, E, and F, all of the disks being supported on a vertical shaft, G, driven by a shaft, H, with which it is connected by gearing I, the shaft H being provided with a driving-pulley, J. The shaft H is journaled in boxes H', and the shaft G is stepped in a bearing, K, and is supported at its upper end by a spider-frame, L.

When the lead drops onto the disks C, as stated, it is carried around by the disk (which is made to revolve by the described gearing) until it comes to a stationary scraper, M. It is then moved off and falls onto the larger disk, D, beneath, and then makes a complete revolution with the disk, and is moved off by a fixed scraper, N, and falls onto a larger disk, E, and is carried around another revolution, when it comes against a scraper, O. This scraper, however, does not remove the lead from the disk, but simply moves it outward slightly toward the periphery of the disk, and the lead then passes through a perforation, O', (see Fig. 4,) in the scraper O, and passes on around until it comes against another scraper, O², which does not cover the entire face of the disk, as shown in Fig. 3, and by this scraper the lead is moved off onto the next disk, F, which is larger than that E. It is carried around on this disk until it comes against a scraper, P, which moves it outward slightly on the disk, and it then passes through a notch in the scraper similar to that O' in the scraper O, and makes another revolution on the disk F until it comes against a scraper, P', that moves it off into the receptacle placed to receive it.

It will be understood that each scraper delivers the lead just behind the scraper beneath it. All of the scrapers are secured at their outer ends to a fixed support, T.

As the lead is moved around on the disks and is moved from one disk to another, it is cooled by a rotary fan, U, journaled in boxes U' on the upper end of a frame, U², it being driven by a belt, J', connecting it with the pulley J.

To deflect the air downward onto the disks, as shown by double-headed arrows in Fig. 1, I provide a bent shield or plate, V. The lead is thus effectually cooled as it passes from the mixer to the receptacle.

I have shown and described four disks; but more or less could be used.

I prefer to make the disks by casting them in one piece, and they might properly be termed or called a block having a series of annular steps.

The scrapers will be made of a proper length to be at such an inclination as to turn the lead over as it is moved by them from one disk to another.

While I have described the invention as for use in cooling and conveying white lead, it may be used for other purposes—as, for instance, the cooling of candy in the manufacture of the article, and for still other purposes.

I claim as my invention—

1. In a white-lead cooler and conveyer, the combination, with the disks increasing in size downward and scrapers for moving the lead from one disk onto another, of a fan for cooling the lead, substantially as set forth.

2. In a white-lead cooler and conveyer, t combination, with the disks increasing in size downward and scrapers for moving the lead from one disk onto another, of a fan located over the disks, and a shield for deflecting the air from said fan onto the disks, substantially as set forth.

3. In a white-lead cooler and conveyer, the combination, with the disks increasing in size downward and fixed scrapers for moving the lead from one disk onto another, of intermediate scrapers having openings to allow the passage of the lead without removing it from the disk, substantially as and for the purpose set forth.

4. In a white-lead cooler and conveyer, the combination, with the disks arranged one upon the other and increasing in size downward, and the fixed scrapers M N, each formed of one piece, of the intermediate scrapers, O and P, each having an opening in the part that is in contact with the surface upon which the material falls, and the scrapers $O^2$ and $P'$, arranged to extend only partly across the surface upon which the material falls, substantially as set forth.

5. The combination, with a circular block having a number of annular steps or flanges increasing in diameter downward and having means whereby it is rotated, and fixed scrapers M N, arranged to scrape the material from one step onto another, of intermediate scrapers, O P, having openings in their impinging edges, whereby the material is allowed to pass without being removed from the step, the scrapers $O^2$ $P'$, arranged to extend only partly across the step, and a fan arranged above said block and having a deflecting-plate, whereby the air from said fan is directed onto the block and the cooling of the material thereby accelerated, substantially as described.

ABRAHAM K. JOHNSON.

In presence of—
GEO. H. KNIGHT,
EDW. S. KNIGHT.